Figure 1:
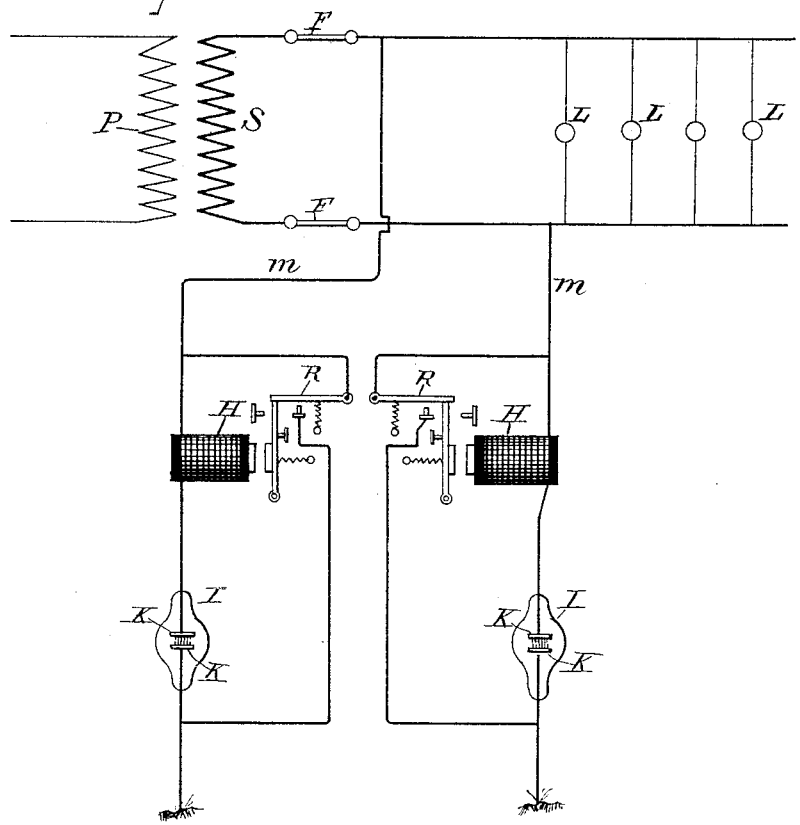

(No Model.) 2 Sheets—Sheet 1.

E. THOMSON.
SAFETY APPLIANCE FOR SYSTEMS OF ELECTRIC DISTRIBUTION.

No. 497,838. Patented May 23, 1893.

ATTEST:
J. A. Hindle
H. H. Capes

INVENTOR:
Elihu Thomson
By H. C. Townsend
Attorney (No Model.) 2 Sheets—Sheet 2.
E. THOMSON.
SAFETY APPLIANCE FOR SYSTEMS OF ELECTRIC DISTRIBUTION.
No. 497,838. Patented May 23, 1893.
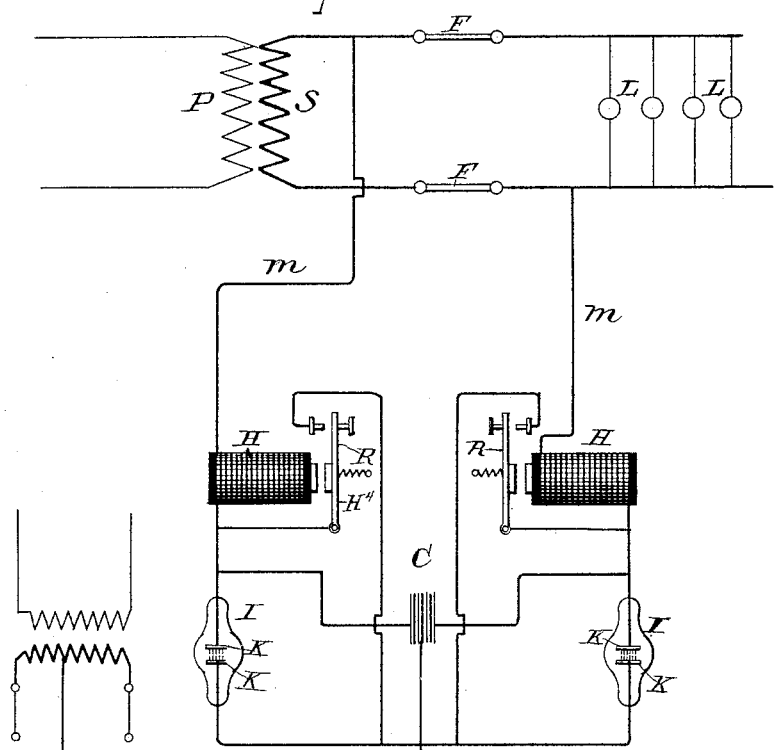
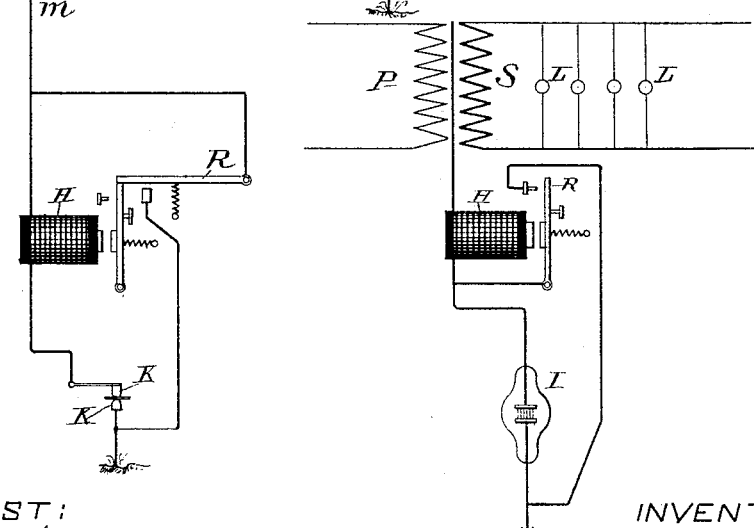
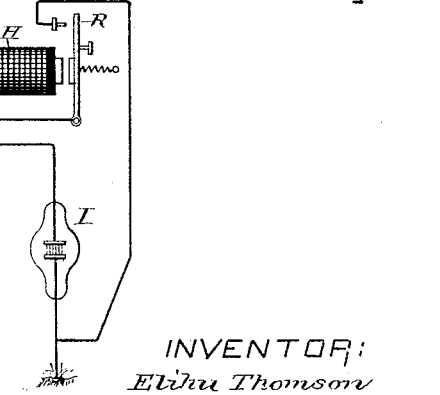
ATTEST:
INVENTOR:
Elihu Thomson
By H. C. Townsend
Attorney

UNITED STATES PATENT OFFICE.

ELIHU THOMSON, OF LYNN, MASSACHUSETTS, ASSIGNOR TO THE THOMSON-HOUSTON ELECTRIC COMPANY, OF CONNECTICUT.

SAFETY APPLIANCE FOR SYSTEMS OF ELECTRIC DISTRIBUTION.

SPECIFICATION forming part of Letters Patent No. 497,838, dated May 23, 1893.

Application filed January 29, 1890. Serial No. 338,523. (No model.)

*To all whom it may concern:*

Be it known that I, ELIHU THOMSON, a citizen of the United States, and a resident of Lynn, in the county of Essex and State of Massachusetts, have invented certain new and useful Safety Appliances for Systems of Electric Distribution, of which the following is a specification.

My invention relates principally to those systems of electric distribution in which high tension electric currents are employed on a main conductor and are converted by means of induction coils, or other transforming or converting appliances such as are well known in the art, into currents of lower tension upon a local circuit.

My invention is likewise applicable, in some of its features, to any electric circuit or conductor which is in such relation or proximity to the high tension circuit as to become liable, under certain conditions, to connection therewith so that the potential or tension of the main circuit may be transferred to the local, and may do damage to persons or property on the latter.

My invention relates especially to the means of bringing about the operation of suitable safety appliances and to the general combinations of apparatus and devices hereinafter described.

My present invention embodies features which are described in an application for patent filed originally by me October 8, 1888, Serial No. 287,564, and is designed to cover specifically one of the ways of carrying out the invention broadly claimed therein.

I have herein illustrated my invention as carried out in connection with that kind of transformer which is known as an induction coil, though it will be obvious that it is likewise applicable to other systems wherein the transformation of energy is produced by the operation of an electric motor which in turn drives the generator for generating the local circuit current of lower tension.

My invention as applied to the local circuits of transformers or converters consists essentially in the provision of a ground branch from the secondary or local circuit normally interrupted by an insulating space so that there is practically absolute insulation for the low tension currents on the local, but that a high tension current may establish for itself a path over such branch and thereby bring about the establishment of conditions of safety by the operation of devices such as switches or other appliances, as well understood in the art, brought into action or made to act through the controlling or energizing force of the current which may flow over such ground branch.

My invention consists also in the provision for the secondary or local circuit, of a ground branch which includes two electrodes normally separated from one another by a space containing an attenuated gas or vapor over which space the high tension current communicated to the local from the main circuit, or from a neighboring conductor, may force its way and may thereby bring about the operation of the safety appliances of any suitable character as hereinafter described.

My invention consists further in the combinations of apparatus hereinafter described, and then specifically pointed out in the claims.

Figure 2:
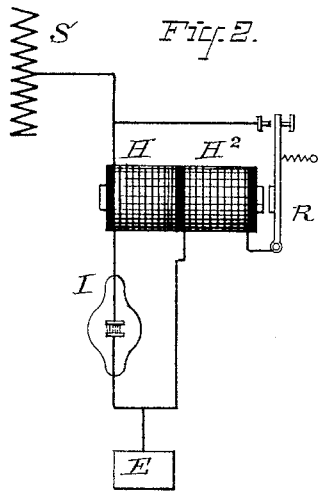

In the accompanying drawings:—Figure 1, is a diagram of an apparatus and arrangement of circuits embodying my invention. Fig. 2, illustrates a modification in the manner of keeping the ground branch switch in closed position after it has been operated by the electro magnet. Fig. 3, illustrates a modification in the manner of combining and applying devices adapted to produce the desired results. Fig. 4, illustrates the application of a condenser to the device, and a modification in the manner of connecting the coils of the magnet that operates the switch. Fig. 5, shows a further modification of my invention.

P, indicates the primary of an ordinary transformer and S, the secondary thereof which latter is adapted to supply currents of lower tension than those of the main circuit including the primary, to translating devices, such as electric lamps L, connected into the local circuit or across the local mains to which the secondary S, is connected.

F, F, F, F, are fuses, of any ordinary and well known description, in the two poles of the main and local circuits.

At $m$, is indicated a ground branch wire or connection leading from the local circuit to earth, but having interposed in it electrodes K, K, normally separated from one another by a narrow insulating space adapted to form a normal insulation between the local circuit and the earth. These electrodes K, K, are preferably separated by an attenuated gas or vapor contained in a vacuous receptacle I, as explained more fully in my prior patent No. 307,818, dated November 11, 1884. A ground connection of this nature is preferably made from both sides of the local circuit.

Interposed in or connected to each circuit $m$, is some electro-responsive device, such as an electro-magnet H, adapted to be actuated or operated in any way by any current which may be established on the ground branches or circuits. In the present instance I have shown an electro-magnet H, for such purpose. This electro-magnet operates a switch or contact device indicated at R, whose contacts are adapted to form a direct connection for the branch wire $m$, to earth around the electrodes K, K. The switch device R, is normally held in open circuit position by the armature lever of magnet H, when such armature lever is in retracted position as shown. When the armature $H^4$, is drawn up by the electro-magnet the switch R, is released and drops against the contact which completes the ground circuit of comparatively low resistance. The switch is held in the contact or circuit closing position by the spring applied to the switch lever as shown. Instead of holding the switch closed by means of a spring, it might be kept closed by the action of electro magnetism, as indicated in Fig. 2, where, as shown, an additional coil $H^2$, is applied upon the core of magnet H, and included in the low resistance ground completed by the action of the switch R. When the switch is retracted the circuit is broken through coil $H^2$, but when the current flows in coil H, and draws up the switch, the coil $H^2$, carries the current which keeps the switch drawn up. It is obvious that the coils H, might perform this service, as is well understood in the art, by including them in the circuit which is completed by the operation of the switch. Such a modification I have shown in Fig. 4, of the drawings.

The coils of the electro-magnet H, are formed of as low resistance as practicable in order that the ground branch or circuit, established by the operation of the magnet, may be of low resistance. When such low resistance circuit is established it forms a safety circuit or ground which will prevent damage to persons or objects coming into connection with the local wire even though such local wire partake of the high potential of the primary P, or other electric circuit accidentally connected to such local. The operation of the low resistance ground as thus formed is through its shunting action which permits it to shunt current which might otherwise pass to ground through a person in a ground connection from the local. So long as no connection exists between the primary coil or circuit P, and the local there will be insulation of the local from the ground, inasmuch as the low potential currents thereon cannot force their way across the two sets of electrodes K, K connected to opposite poles of such circuit. If, however, a connection, either temporary or permanent, is formed between the local circuit or secondary and the primary or other conductor such that the potential of the primary or other line is taken up by the secondary, the high potential on the local will pass to ground over the space between the electrodes K, K, provided, of course, that anywhere on the main line of the primary P, a sufficient leakage or static inductional capacity or tendency exists to give rise to the necessary disruptive power at the electrodes.

The effect of the establishment of circuit over the ground branch may be two-fold. In the first place the current fed from the main line may of itself operate to melt fuses F, but even if it should not, the immediate formation of the low resistance or safety ground before referred to, which also takes place through the action of the magnet H, will bring about the rupture of the fuses F. The rupture is insured whenever, which is usually the case, the low resistance ground is closed through both of the ground branches by the passage of the current across the vacuous space between both sets of electrodes. The ground connections of low resistance thus established also act as safety appliances as before explained.

Instead of operating on fuses F, or upon a switch adapted to close a low resistance ground, I might cause the electric current which passes over the ground connection to operate upon any other switching appliance or safety device by any of the means known in the art.

As shown in Fig. 3, the ground connection might be taken from the middle of the secondary of the induction coil, or might be connected to an interposed septum between the primary and secondary as indicated in Fig. 5, and as explained in my prior patent No. 322,138.

The operation of a safety appliance as before explained might be brought about by the use of a ground branch containing electrodes separated by a thin film of some solid insulating material as indicated in Fig. 3, where the electrodes are shown as separated by a thin film of paper or similar material which normally holds them apart or keeps them insulated from one another. Such film might be even a material such as oxide of lead in the form of a paste which is an insulator normally but which may, by the heat of the current passing from one electrode to the other, be reduced to a conducting state so as to assist in forming a union or connection between the electrodes. The disruptive current passing across the electrodes K, K, forms the union or connection between the same through the layer of insulating material by puncturing the material allowing the electrodes to be forced together by spring action, by arcing and melting of the metal, transfer of metal, or by other actions due to the passage of the electric current.

The general operation of the device when applied in the ground circuit would be as before to normally oppose an absolute insulation to the passage of currents from the low tension circuit to earth, but to permit the establishment of a connection when the local circuit becomes of abnormally high potential.

While I have described two ways of arranging the electrodes in the ground connection so as to make a practically absolute insulation for normal conditions of such circuit, I might employ any other arrangement which would give the same normal insulation but which would permit an abnormally high potential on the local circuit to establish the ground connection and to thereby bring about through the controlling or actuating power of the electric current on such ground connection, the operation of electric switches, safety appliances, fuses or other apparatus.

It is well in some cases to shunt the electrodes K, K, Fig. 1, separated by the attenuated gas or vapor, through a condenser of any usual description such as indicated at C, Fig. 4. When this condenser is employed a small amount of static induction or leakage may occur between the primary and secondary without resulting in the flow of a current over the ground branch across the space between the electrodes K. If, however, a good connection be formed between the primary circuit and the secondary, then the condenser C, becomes insufficient in capacity to condense the electricity and lower the potential of the alternating discharges which reach the secondary, and the alternating currents find their way to earth across the vacuous space between the electrodes K.

In another application for patent filed by me August 5, 1889, Serial No. 319,834, I have shown this device as applied to electrodes separated as described in connection with Fig. 3, and I have claimed broadly in that application the combination of a condenser with electrodes separated by a thin layer of any insulating medium.

I do not claim herein, broadly, the combination with electrodes separated by a thin layer of some insulating medium and placed in a ground connection from the conductor liable to acquire a normally high potential, of a condenser in a branch or shunt around such electrode, as this is claimed in my application, Serial No. 319,834, filed August 5, 1889, and allowed December 13, 1889.

I do not claim in this application, broadly, the use of the ground branch of any resistance, either very high or absolute, for bringing about the establishment of the safety ground of my prior patent, No. 322,138, as this forms the subject of my prior application, Serial No. 287,564, filed October 8, 1888.

What I claim as my invention is—

1. The combination substantially as described, of a main line, a transformer, a local line or circuit supplied with energy therefrom, a ground branch or connection taken from a part of the apparatus normally out of connection with the main line but adapted to receive any high tension current escaping thereto from the main line and normally interrupted by an insulating space, and means for establishing or forming a low resistance ground from the local circuit by the action of the high tension current escaping from the main line to the normal ground connection and across the insulating space therein, as and for the purpose described.

2. The combination with a ground branch containing electrodes separated by a narrow vacuous space, of a condenser in a branch around the same, as and for the purpose described.

3. The combination with a local circuit on which currents of low potential are produced by conversion from a high potential circuit, of a ground branch from the local normally interrupted by an insulating space, a low resistance ground connection from such circuit, a switch for controlling the same, and an electro-responsive device actuated or controlled by the current established over the ground branch by a high potential on the local.

4. The combination substantially as described, of a main line, a transformer, a local line supplied from such transformer, a safety fuse in a circuit of said transformer, a ground branch from the local line or a part connected therewith containing electrodes normally separated from one another by a narrow insulating space, and means for completing a low resistance ground connection from said local circuit by the action of a high tension current escaping from the main line to the local and passing across said electrodes whereby a low resistance path shall be formed through which current may flow for operating said fuse.

5. The combination with a transformer or converter, of a ground branch from the local or secondary circuit forming normally an absolute insulation for the said circuit, and a switch controlling magnet or other electro-responsive device adapted to be operated by any current established on such ground branch.

6. The combination, substantially as described, of a high tension main line, a lower tension local line, an interposed transformer, a ground branch from a part of the apparatus disconnected from the main line but containing electrodes separated from one another by a space containing a gas or vapor and adjusted as described to permit any main line current of the normal tension escaping therefrom to force its way across from one electrode to the other, and a fuse in a circuit of said transformer and in position to be operated by current flowing from the main line to the local and thence to ground, as and for the purpose described.

7. The combination with a transformer, of a low resistance ground connection, a circuit closer therefor, and a controller magnet for said circuit closer placed in connections to earth including contacts or electrodes separated from one another by a narrow insulating space.

8. The combination with an electric circuit liable to accidental connection with a high tension circuit, of electrodes placed out of contact but in proximity to one another in a ground branch from the first named circuit, and a safety switch controlled by the current passing over the circuit including said electrodes.

9. The combination with an electric circuit or conductor liable to connection with a high tension circuit, of a ground branch containing electrodes insulated from one another by a space across which a high tension current may make its way, a circuit closer for closing a low resistance safety circuit to ground such as described, and a controlling magnet or other electro responsive device controlling said circuit closer and connected to the ground branch circuit containing said electrodes.

10. The combination substantially as described, of a main line, a transformer, a local circuit supplied from the secondary thereof, fuses between each pole of the secondary and the local lines supplying the translating devices, a ground connection from each pole of the secondary including electrodes normally separated from one another but adapted to form a path for a high tension current escaping from the main to the local and to ground across the space between the electrodes, and means for establishing a substitute low resistance ground connection when said high tension current passes, as and for the purpose described.

11. The combination substantially as described, of a main line, a transformer, a secondary therefor supplying translating devices with energy transformed from the main, a ground connection including two electrodes separated from one another by a narrow insulating space, and means for establishing a substitute low resistance ground by the current passing across the space between said electrodes, and escaping from the main line to the local and to said ground connection.

12. The combination substantially as described, of a main line carrying currents of comparatively high potential, a transformer, a local line or circuit supplied from the secondary thereof, a ground connection taken from parts normally disconnected from the line but containing electrodes separated from one another by a narrow insulating space, and safety devices actuated or controlled by the high tension current escaping from the main line to said ground connections and across the insulating space between the electrodes therein.

Signed at Lynn, in the county of Essex and State of Massachusetts, this 24th day of January, A. D. 1890.

ELIHU THOMSON.

Witnesses:
JOHN W. GIBBONEY,
ALBERT L. ROHRER.